July 7, 1970     C. L. CLAFF     3,518,995
CONTRACEPTIVE ARTICLE
Filed Oct. 23, 1967     3 Sheets-Sheet 1
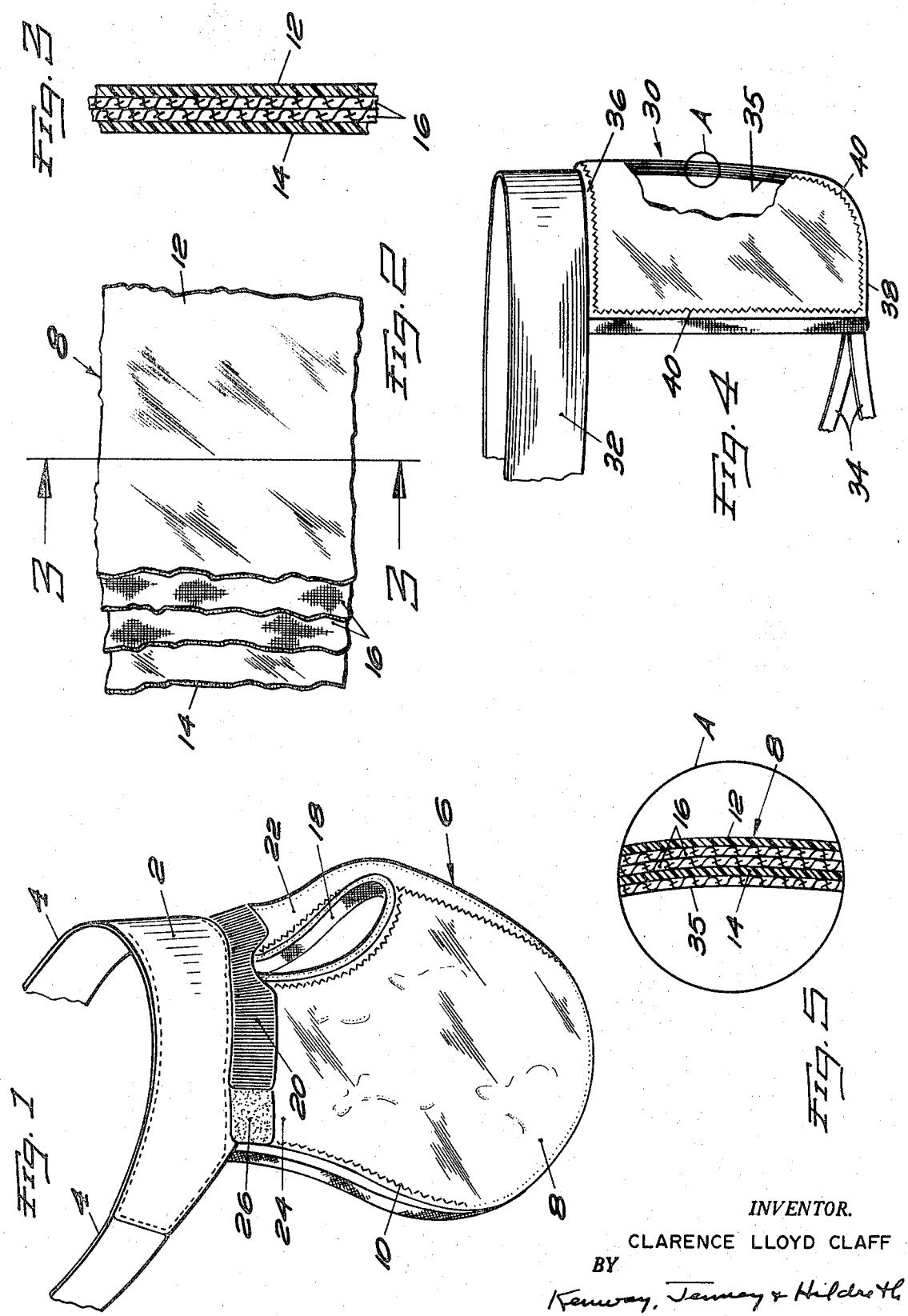
INVENTOR.
CLARENCE LLOYD CLAFF
BY
Kenway, Jenney & Hildreth
ATTORNEYS July 7, 1970  C. L. CLAFF  3,518,995
CONTRACEPTIVE ARTICLE
Filed Oct. 23, 1967  3 Sheets-Sheet 2
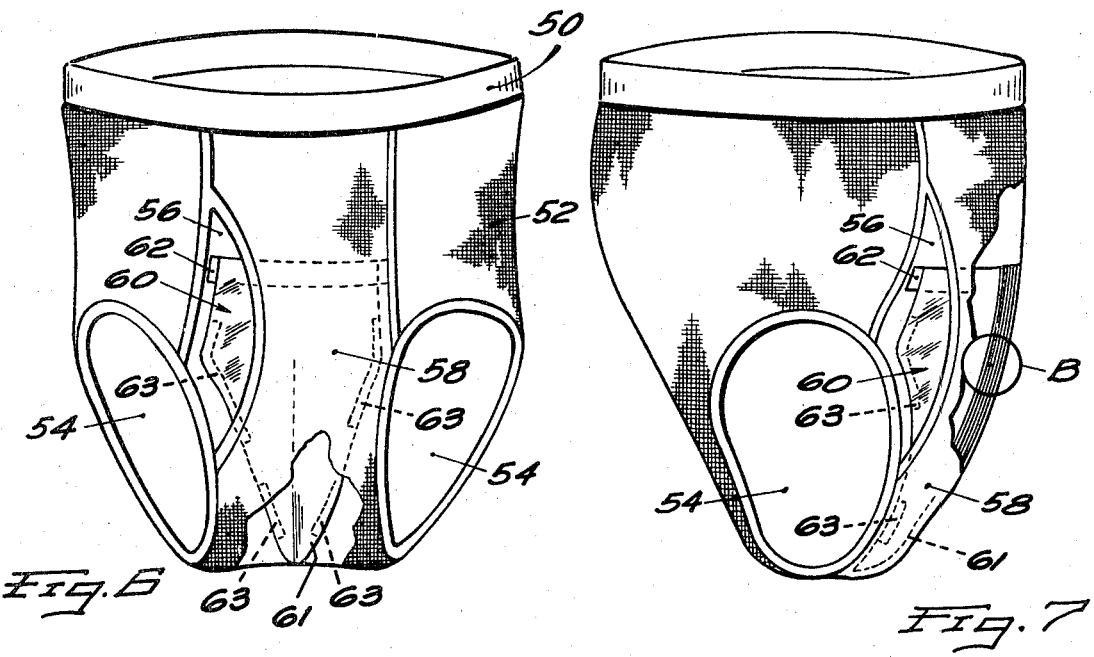
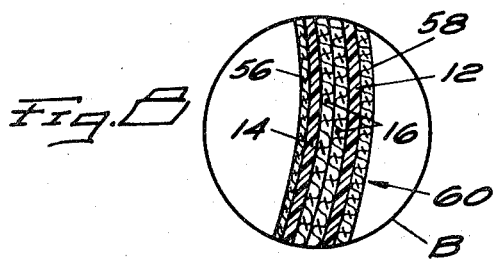
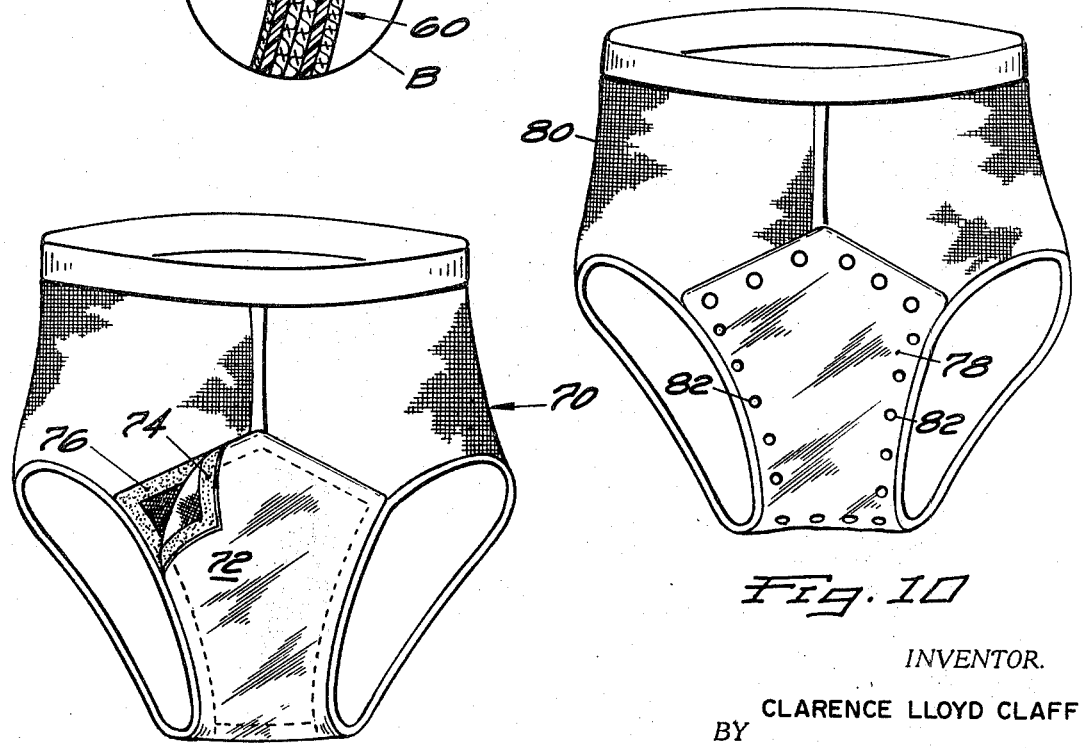
INVENTOR.
CLARENCE LLOYD CLAFF
BY Kenway, Jenney + Hildreth
ATTORNEYS United States Patent Office 3,518,995
Patented July 7, 1970

3,518,995
CONTRACEPTIVE ARTICLE
Clarence Lloyd Claff, Van Beal Road,
Randolph, Mass. 02368
Filed Oct. 23, 1967, Ser. No. 677,435
Int. Cl. A61n 5/00
U.S. Cl. 128—379                    9 Claims

ABSTRACT OF THE DISCLOSURE

A contraceptive device to be worn by men as an article of clothing which, when worn, causes the man's scrotum to be raised in temperature above its normal body heat, the latter being 1° to 1.5° F. below body tempertaure. The invention comprises a man's suspensory or jockstrap, or a pair of jockey shorts, to which has been applied, either permanently or detachably, a moisture-resistant heat reflective, flexible soft panel. Because of the heat reflective and moisture-resistant characteristics of the panel, the temperature of the scrotum and thus the testicles will rise 1.5° to 3° F. above the temperature they would be at were the device not being worn, this occurrence rendering the man sterile on a temporary basis, that is, for as long as he wears the device.

BACKGROUND OF INVENTION

The field of the invention lies in contraceptive devices, but in this instance is a device to be worn by the male instead of the female. The function of the invention is to reduce the spermatozoa contained in the ejaculated semen of the man to a point that the man is, for all intents and purposes, sterile.

It has been known since approximately 1922 that the scrotum regulated testicular temperature. It has also been known since approximately the same time that intrascrotal hyperthermia has an adverse influence on spermatogenesis. During the past few decades, supporting evidence of this has accrued, including clinical findings on the suppression of spermatogenesis in disorders such as cryptorchidism, variocele, and acute febrile diseases. (See "Effect of Induced Intrascrotal Hyperthermia on Testicular Function in Man," American Journal of Obstetrics and Gynecology, John Rock, M.D. and Derek Robinson, M.D., volume 93, No. 6, pages 793–801, Nov. 15, 1965.) In addition, there have been a few reports relating oligospermia to the wearing of tight jockey shorts and suspensories which might increase intrascrotal temperature.

Tests have been done by the aforementioned Doctors Rock and Robinson to explore the function of the scrotum in temperature regulation, as well as to study the effect of temperature changes on spermatogenesis. At the beginning, the cited article points out that if it can be established that induced intrascrotal hyperthermia is a cheap, easily available, and effective means of suppressing spermatogenesis without change in sexuality, yet permitting complete recovery of full spermatogenesis when desired, then a simple way of increasing scrotal temperature should prove readily acceptable to large numbers of men resistant to other more disturbing or expensive methods of reducing fertility. In view of the anticipated enormous growth in the world's population in the next thirty to fifty years, the need for a simple but effective contraceptive is well-known.

As a result of tests by Doctors Robinson and Rock (as reported in the aforementioned citation as well as in the publication "Intrascrotal Hyperthermia Induced by Scrotal Insulation: Effect on Spermatogenesis" printed in Obstetrics and Gynecology, volume 29, No. 2, February 1967 by said Doctors Derek Robinson and John Rock) it has been found that whereas the normal spermatozoa count per cubic centimeter in a man's semen upon ejaculation runs in the order of 100 million to 200 million, yet if the scrotum of the man is kept at a temperature which is a matter of 1.5° C. or more higher than the man's rectal temperature, the spermatozoa count will drop to an average of 8 to 10 million per cubic centimeter. With a count of 8 to 10 million spermatozoa per cubic centimeter, to all intents and purposes the man is infertile. The tests made by Dr. Robinson and Dr. Rock have also shown that if a man wears the type of clothing which will permit his scrotum and thus his intrascrotal temperatures to become normal, then the spermatozoa count per cubic centimeter of semen will rise to a normal figure at which the man is fertile. It has been found by the aforementioned tests that all of the subjects tested remained oligospermic from three weeks up to as long as eight weeks after stopping use of the means used to raise the intrascrotal temperatures. Thereafter, the subjects eventually returned to their normal, characteristic spermatozoa count.

However, it has been found that a rebound effect takes place when the scrotum and testicles are permitted to return to normal temperatures. If, after having been made sterile by wearing the subject invention (a man being considered sterile if his spermatozoa count per cubic centimeter of seminal fluid is less than $20 \times 10^6$), the man ceases to wear the device, his sperm count rises from two to four times its normal count. Thereafter the count gradually drops to normal levels.

This rebound effect could be used, therefore, to assist in making fertile a normally infertile man by having such an infertile man wear the device for a period of time. Then, upon not wearing the device the rebound effect could cause the sperm count to rise to the fertile range temporarily, but sufficiently long for having his spouse become pregnant.

SUMMARY

Therefore, the invention, briefly, relates to contraceptive devices and in particular to a contraceptive device to be worn by men which has the effect of rendering the men oligospermatoic and thus infertile. Therefore, among the several objects of the invention may be noted the provision of an article to be worn by men which will reduce the normal count of spermatozoa in the man's semen a count at which the man is to all intents and purposes infertile; the provision of an article of the aforementioned class which may be worn comfortably by the individual and which will both cover the scrotum and hold the latter securely but softly against the body of the person in such manner as to exclude free circulation of air about the scrotum; the provision of an article of either of the above classes which will cover the scrotum of a male person with a heat reflective and moisture-resistant panel, thus causing a rise in temperature of the scrotum with consequent intrascrotal rise in temperature; the provision of an article of any of the above classes in which that portion thereof which is heat reflective and moisture-resistant may be removed for the purpose of washing the remaining portions of the garment; the provision of an article designed to suppress fertility in a man, which may be conveniently applied or attached to standard articles of men's underwear; and the provision of a contraceptive device of any of the above kinds which is simple to make, and comfortable and easy to use. Other objects and advantages will be in part obvious and in part pointed out hereinafter.

The invention accordingly comprises the elements and combinations of elements, features of construction, and arrangements of parts which will be exemplified in the structures hereinafter described, and the scope of the application of which will be indicated in the appended claims.

In the accompanying drawings, in which several of the various possible embodiments of the invention are illustrated:

FIG. 1 is an illustration of a first embodiment of the invention, the embodiment in this instance taking the form of a man's suspensory;

FIG. 2 is a portion of a panel of heat-insulating and moisture-resistant material used in making the FIG. 1 embodiment;

FIG. 3 is a section of the FIG. 2 panel, taken in the direction of sight lines 3—3 on FIG. 2;

FIG. 4 is a side elevation of a second embodiment of the invention, partly in section, the second embodiment taking the form of a man's jockstrap or athletic supporter;

FIG. 5 is an enlarged view of a portion of the FIG. 4 embodiment, the figure corresponding to that portion of the FIG. 4 which is encircled;

FIG. 6 is a front elevation of a third embodiment of the invention, in this case taking the form of a pair of jockey shorts;

FIG. 7 is a side elevation of the FIG. 6 embodiment, partly in section;

FIG. 8 is an enlarged view of a portion of the FIG. 6 drawing, given to show in greater detail certain features of construction, FIG. 8 corresponding to the encircled portion of FIG. 7;

FIG. 9 is a front elevation of a third embodiment of the invention;

FIG. 10 is a front elevation of an alternative way of making the FIG. 9 embodiment.

Throughout the drawings, similar reference characters indicate corresponding parts. Also, dimensions of certain of the parts as shown in the drawings may have been modified and/or exaggerated for the purposes of clarity of illustration and understanding of the invention.

Figure 11:
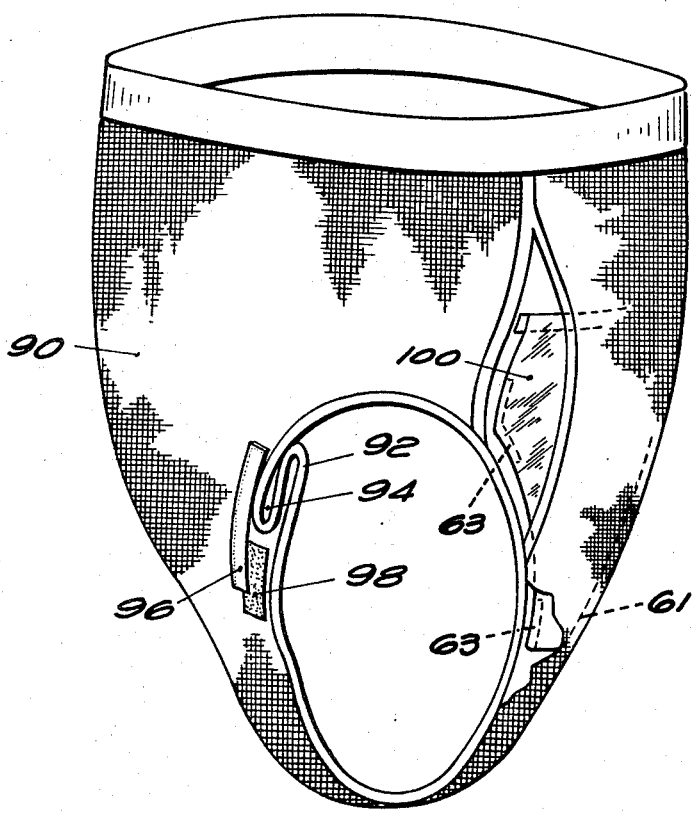
FIG. 11 is a side elevation of a modification of the FIG. 6 embodiment.

Referring first to FIG. 1, there is illustrated a man's suspensory of generally conventional nature, but modified in accordance with the invention as well be described below. The suspensor consists of a top supporting band 2 with the usual elastic strap 4 for encircling the man's body (only a portion of the strap being shown), and a bag or a pouch 6 (indicated generally) for holding the man's scrotum. It will be understood that insofar as pouch 6 is concerned, it is formed in usual fashion and from soft flexible fabric such as cotton. However, in this embodiment of the invention, there is attached to the front of the pouch a layer 8 of heat-insulating and moisture-resistant material, the attachment being made, for example, by a row of stitching 10 which follows the perimeter of the panel 8 in such manner that the panel covers completely the pouch 6. Since the entire pouch is thus surrounded by the panel 8, the result is that when the scrotum is at rest in the suspensory, very little if any of the heat of the scrotum can escape from the pouch, and also most of the normal moisture which otherwise would be extruded by the skin layers of the scrotum are retained. The result of so enveloping the scrotum is to raise the temperature of the latter above its normal temperature with the result that spermatogenesis is seriously curtailed. The amount that the scrotum should be raised above its normal temperature is at least 1.5° C.

Referring to FIGS. 2 and 3, there is shown a portion of panel 8 to illustrate its general plural-layer construction. It comprises front and back layers 12 and 14 of moisture-resistant plastic. Between these front and back layers is placed at least one layer (but preferably two) of heat reflective material 16, the material being, for example, that material which is sold under the trademark Melium. (Melium maetrial is a layer of fabric which has been coated on both sides with aluminum of such thinness that the fabric retains most of its original flexibility. It has a high heat reflecting ability, and is a product of Deering, Milliken & Co., Inc.) As indicated, only one layer of the material 16 may be used if desired, but it has been found in practice that the use of two layers is more efficacious and is to be preferred.

In order to assist the thus formed contraceptive suspensory in performing its function of raising the scrotal, and thus the intrascrotal, temperature of the wearer, means are provided for closing the opening 18 in the suspensory firmly and yet comfortably about the penis of the wearer. In this embodiment, this takes the manner of a strap 20 of one part of the fastener material known as Velcro tape fasteners. The material comprises two pieces of cloth one of which is formed with small hooks of plastic and the other of a very loosely woven layer of cotton fibre. When the two materials are pressed together, the hooks catch in the cotton fibre and hold the two layers together. However, in order to get them apart, all that is necessary is to grasp each portion and pull the ends away from each other, thus causing the hooks to part from the cotton of the other layer. In this instance, the strap 20 may have the hook portion, and the strap is attached to one side 22 of the suspensory. On the other side 24 of the suspensory there is attached the matching cotton fibre portion 26 of the Velcro material. When the suspensory is worn, the strap 20 is pulled toward the side 24 until the proper fit is obtained, and then it is pressed against the matching part 26 thus holding the parts together.

Referring now to FIGS. 4 and 5, there is shown a second embodiment of the invention, this embodiment taking the form of a man's athletic supporter or jockstrap. The support or jockstrap for the most part takes the form of a pouch 30 to which is attached a waistband 32 for holding the supporter to the man's body, and the usual pair of elastic bands 34 which run from the bottom portion of the pouch up to the back portion of the band 32, the function of the straps 34 being that of holding the pouch against the body of the wearer and preferably with the bottom edge 36 thereof somewhat between the thighs of the wearer. (Only portions of the waistband 32 and straps 34 are shown, due to their conventional construction.)

Pouch 30 is made, as usual, of a loosely woven somewhat elastic cotton material (or nylon, if desired) the top edge of the material being attached as at numeral 36 to the band 32, and the bottom edges 38 of the material being gathered so that the whole pouch is conventionally formed to lie comfortably against the body with the bottom of the pouch lying somewhat between the thighs of the wearer.

In this embodiment, the pouch 30 includes a panel of the FIG. 2 material which is attached to the pouch 30 by means of conventional stitching 40. The panel lies flat against the inner cloth portion of pouch 30. As shown in FIG. 5, the resulting complete pouch is thus composite and comprises the normal layer of cloth 35 of the jockstrap, a layer of plastic 14, two layers 16 of the Milium material, and a final outer layer 12 of plastic. (The view shown in the circle of FIG. 5 is a view indicated by the letter A in FIG. 4.)

In use, the athletic supporter is worn as is customary with the composite pouch enfolding and holding the penis and scrotum of the wearer gently but firmly against the body of the wearer. Due to the construction of the device and its ability to conform to the body of the wearer, it will be found that there is little if any circulation of air around the scrotum. Also, there will be little if any loss of moisture throughout the panel material 8. As a result, it will be found that the scrotum will rise in temperature sufficiently above its normal temperature to cause sufficient drop in spermatozoa production to result in the man being, to all intents and purposes, infertile.

Referring now to FIGS. 6, 7 and 8, a third embodiment of the invention is shown, in this case taking the form of a pair of man's jockey shorts. The shorts in this case are conventional in nature, except as will be noted below, and have the elastic waistband 50 to which is attached by conventional means the body 52 of the shorts, this body being formed with the closely-fitting leg holes 54. As is also customary, the front of the jockey shorts comprises the two overlapping front and back panels 56 and 58 respectively.

In this instance, a feature of the invention is that the panel of heat insulating and moisture-resistance material is detachably mounted to the shorts between the panels 56 and 58 so that the panel may be removed therefrom, and the panel is shaped to form a pouch, much like the shape of the pouch 30 of FIG. 4. The shorts themselves may then be washed in the usual way, while the panel may be handwashed. After the shorts and panel are thus cleaned, the panel is put back in place.

In this embodiment, the panel is made of the material as shown in FIG. 2, that is, it has preferably the front layer of plastic 12, the back layer of plastic 14, and two inside layers 16 of Milium material, the edges being stitched together. The panel is indicated generally by numeral 60 and is cut and sewn to conform at its top generally to the shape of overlapping panels 56 and 58, as shown by dotted lines in FIG. 6. Its bottom edge is folded and brought together so as to form a scrotum-receiving pouch 61 (indicated by dotted lines in FIGS. 6 and 7) opening toward the wearer's body. The bottom portion of panel 56 lies within pouch 61 when the garment is worn, the pouch thus being capable of fully developing the wearer's scrotum. Panels 60 is held to back panel 56 by attaching at its top a band 62 of the hook portion of the Velcro fastener. The companion band of the Velcro material (not shown) is attached to the back panel 56, the attaching being done in each instance by conventional means such as stitching. Additional portions 63 of Velcro tapes are suitably attached, as indicated by dotted lines in FIGS. 6 and 7, to hold the pouch 61 securely to the panel 56 and so as to form the latter into a pouch or pocket lying within pouch 61. Thus, when it is desired to remove the panel 60 from the jockey shorts themselves, all that is necessary to separate the companion strips of the Velcro material and the panel 60 and pouch 61 formed thereby may then be completely removed from within the space between panels 56 and 58, and the shorts may then be washed as indicated above.

In use, the panel 60 falls down within the overlapping layers 56 and 58, and thus extends down and around to a point somewhat between the thighs of the wearer because of the fact that the panel 58 also extend between the thighs of the wearer. The wearer's scrotum and penis are thus fully enveloped, and as a result, this embodiment has the same effect as the first two embodiments in that due to the heat-insulating and moisture-resistant character of the panel 60, the scrotum temperature and thus the intrascrotal temperature will be raised above the normal values with a resultant decrease in the spermatogenesis of the person wearing the article.

Referring now to FIGS. 9 and 10, modifications of the FIG. 6 embodiment are shown, in which the panel of heat-insulating material may be detachably separated as a whole from a standard article of wear such as the men's jockey shorts of FIG. 6, but in a different manner. Also, the panel 60 has not, in these embodiments, been formed into a pouch, since the shorts themselves may be a sufficiently tight fit to eliminate the need for a pouch. In this instance, the jocket shorts indicated generally by numeral 70 could be, for example, that type known as bikini shorts. That is, these shorts do not have any front opening. Thus, there is no overlapping layer such as the layers 56 and 58 of FIG. 6, in which a panel of material may hang. However, in this embodiment, a panel 72 made of the heat-insulating and moisture-resistance formation shown in FIG. 2 has fastened around its entire peripheral edge, as by stitching or suitable flexible cement, a marginal strip 74 of the hook material of the aforesaid Velcro cloth fastener. An aligning and matching strip 76, which is the mate of the strip 74, is attached as by stitching or suitable flexible adhesive to the body material of the shorts 70. The attachment is made so that when the shorts are worn, the panel 72 will completely cover the penis and scrotum of the man wearing the article, with the result that again the scrotal temperature is elevated and spermatogenesis of the wearer is sharply decreased.

The FIG. 10 embodiment is the same as the FIG. 9 embodiment, with the exception that in this instance the panel 78 (which is made, except for the manner of attaching it to the shorts 80, the same as the panel 72) is attached to the front of the shorts by a series of snaps 82 the mating parts of which are fastened, respectively, by conventional means to the body of the shorts 80 and to the panel 78.

Finally, referring to FIG. 11 a further embodiment of the invention is shown which is a modification of the FIG. 6 embodiment with its pouched panel. It has been mentioned above that for best results in the use of the contraceptive device, it is necessary to prevent as much as possible the free circulation of air around the scrotum of the wearer. Thus, it is desired at all times to have the leg holes 54 of the shorts to be a snug but comfortable fit around the thighs of the wearer. To this end, the leg holes of a pair of jockey shorts 90 are deliberately made larger than the expected size of the thighs of the wearer, so that the material of the shorts may be gathered and overlapped as indicated by numeral 92. If the material of the leg holes is thus overlapped and pulled snugly but firmly about the thighs of the wearer, a tuck 94 will be made. Tuck 94 may be held down and in place by means of a strap 96 of the Velcro fastener material, one portion of the strap being attached to the material of the shorts as shown, and the mating portion 98 being attached to the peripheral portion of the leg hole. Thus, once the material around the leg hole is drawn snugly against the wearer's thighs, the strap 96 is pressed against strap 98 to hold the material snugly in place. The result is to greatly lessen free flow of air around the scrotum of the wearer, with resulting decrease in spermatogenesis. As in the prior embodiments, a panel 100 is made up as is the panel 60 of the FIG. 5 embodiment, this panel being held between the front layers of the jockey shorts as is the panel 60 in FIG. 5.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. A contraceptive article to be worn by a male person, comprising a panel of at least three layers of flexible sheet material in face-to-face relationship, the first and third layers being of thin moisture resistant plastic, and the second layer being of heat-reflective material; first means adapted to be worn by the person for holding said panel against the person's body in position to cover the scrotum; and second means for holding said panel to said first means.

2. The article of claim 1 in which said panel is wider at the top portion thereof than it is at the bottom portion, the bottom portion being adapted to lie between the thighs of the person when the article is being worn so as fully to cover the scrotum.

3. The article of claim 1 in which said first means comprises a cloth suspensory having a scrotum receiving pouch, and said second means comprises marginal securing means fastening the edge portion of said panel to the cloth of the pouch, said panel conforming to the shape of the pouch when so fastened and covering approximately all of the latter, thereby to prevent free flow of air around, and heat loss from, the scrotum, when the article is worn.

4. The article of claim 1 in which said first means is a man's undergarment having overlapping front layers of cloth forming a pocket therebetween, said second means constituting said pocket, the panel being shaped to conform to the shape of said pocket, and portions of the pocket and contained panel being adapted when worn at least partially to envelop the man's scrotum and hold it against the wearer's body, to prevent flow of air around, and heat loss from, the scrotum thereby to raise the temperature of the latter.

5. The article of claim 4 including third means for detachably attaching a marginal portion of the panel within said pocket to one of said layers forming said pocket, said third means being so located that the panel extends downwardly in the pocket and is formed to cover the scrotum when the undergarment is worn.

6. The article of claim 5 in which said third means constitutes a plurality of cooperating separable fasteners, the component parts thereof being attached respectively to the panel and to said layer.

7. The article of claim 5 in which said third means constitutes a continuous separable fastener, the component parts therefor being attached respectively to the panel and to said layer.

8. The article of claim 1 in which said first means constitutes a man's undergarment having a front layer adapted to conform closely to the wearer's body when worn and having a portion covering at least the man's scrotum, and said second means comprises separable fastening means, the component parts thereof being respectively attached to the edge portions of said panel about its perimeter and to said front layer, whereby, when said front layer covers the scrotum, said layer positions the panel to cover the scrotum in thermal and moisture shielding relation theerto, thereby to raise the temperature of the scrotum at least 1.5° C. above body temperature.

9. The article of claim 1 in which the layer of heat reflective material is a layer of flexible fabric coated with a flexible metallic layer capable of reflecting heat energy.

References Cited
UNITED STATES PATENTS

| | | | |
|---|---|---|---|
| 1,421,077 | 6/1922 | Goldsmith | 128—160 |
| 1,588,066 | 6/1926 | Thorp | 128—160 |
| 2,573,791 | 11/1951 | Howells | 128—254 XR |
| 2,798,484 | 7/1957 | Boudreaux | 128—158 |

L. W. TRAPP, Primary Examiner

U.S. Cl. X.R.

2—224; 128—132, 158